US008250142B2

(12) United States Patent  
AbiEzzi et al.

(10) Patent No.: US 8,250,142 B2  
(45) Date of Patent: *Aug. 21, 2012

(54) INTERNET VIDEO CONFERENCING ON A HOME TELEVISION

(75) Inventors: Salim S AbiEzzi, Sammamish, WA (US); Kosar Jaff, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 377 days.

This patent is subject to a terminal disclaimer.

(21) Appl. No.: 12/259,404

(22) Filed: Oct. 28, 2008

(65) Prior Publication Data

US 2009/0046138 A1 Feb. 19, 2009

Related U.S. Application Data

(63) Continuation of application No. 11/109,905, filed on Apr. 20, 2005, now Pat. No. 7,447,741, which is a continuation of application No. 10/742,551, filed on Dec. 19, 2003, now Pat. No. 7,447,740.

(51) Int. Cl.  
*G06F 15/16* (2006.01)  
*H04N 7/173* (2011.01)

(52) U.S. Cl. .......................... 709/204; 709/231; 725/110

(58) Field of Classification Search .................. 709/205, 709/231; 725/105, 109, 110  
See application file for complete search history.

(56) References Cited

U.S. PATENT DOCUMENTS

| | | | |
|---|---|---|---|
| 5,587,928 A | 12/1996 | Jones et al. | |
| 5,886,732 A * | 3/1999 | Humpleman | 725/49 |
| 6,100,918 A * | 8/2000 | Lu | 348/14.08 |
| 6,727,935 B1 | 4/2004 | Allen et al. | |
| 6,831,899 B1 | 12/2004 | Roy | |
| 6,889,385 B1 * | 5/2005 | Rakib et al. | 725/119 |
| 6,915,528 B1 | 7/2005 | McKenna, Jr. | |
| 7,003,795 B2 | 2/2006 | Allen | |
| 2001/0049720 A1 | 12/2001 | Eyer | |
| 2002/0186243 A1 | 12/2002 | Ellis et al. | |
| 2003/0041333 A1 | 2/2003 | Allen et al. | |
| 2003/0093568 A1 | 5/2003 | Deshpande | |
| 2003/0232648 A1 | 12/2003 | Prindle | |
| 2004/0015597 A1 * | 1/2004 | Thornton | 709/231 |

(Continued)

OTHER PUBLICATIONS

Cochrane, "Conference Lines", retrieved on Apr. 3, 2007, at <<http://www.theage.com.au/cgi-bin/common/popupPrintArticle.pl?path=/articles/2003/03/04/..>>, Mar. 2003, pp. 1-4.

(Continued)

*Primary Examiner* — Lynn Feild  
*Assistant Examiner* — Lin Liu  
(74) *Attorney, Agent, or Firm* — Lee & Hayes, PLLC

(57) ABSTRACT

A home network integrates a television to enable a user to use the television to conduct an Internet video conference by leveraging the Internet video conferencing functionality provided by a home computer connected to the Internet. The television is connected to the home network via a TV client module, and a video camera co-located with the television is also connected to the TV client. The TV client presents on the television an Internet conferencing option selectable by a user to invoke the video conferencing functionality of the personal computer. During the video conference, video and audio data captured by the video camera are transmitted by the TV client over the home network to the personal computer for forwarding onto the conferencing parties on the Internet, and user interface data representing video/audio streams received from the Internet are transmitted by the personal computer to the TV client for display on the television.

16 Claims, 5 Drawing Sheets

U.S. PATENT DOCUMENTS

2004/0041902 A1* 3/2004 Washington ............... 348/14.01
2005/0005305 A1 1/2005 Shachar et al.
2005/0254630 A1* 11/2005 Tokoro ........................... 379/52

OTHER PUBLICATIONS

Hamm, et al., "Bill Gates's New Focus: Streaming Video", retrieved on Apr. 3, 2007, at <<http://www.businessweek.com/@@khe91YQASKecmAA/1998/19/b3577091.htm>>, The Mc Graw-Hill Companies Inc., 1998, pp. 1-4.

Lichtman, "Telepresence, Effective Visual Collaboration and the Future of Global Business at the Speed of Light", pp. 1-53, Aug. 2006.

"Polycom Guide to Conferencing and Collaboration", Polycom, 2003, pp. 1-11.

"Remote Desktop Protocol (RDP) Features and Performance", retrieved on Sep. 20, 2007, at <<http://www.microsoft.com/technet/prodtechnol/Win2KTS/evaluate/featfunc..>>, pp. 7.

* cited by examiner

INTERNET VIDEO CONFERENCING ON A HOME TELEVISION

RELATED APPLICATIONS

This is a continuation of and claims priority to U.S. patent application Ser. No. 11/109,905 filed on Apr. 20, 2005, which is a continuation of U.S. patent application Ser. No. 10/742,551 filed on Dec. 19, 2003.

TECHNICAL FIELD

This invention relates generally to computer networking in a home setting, and more particularly to a system and method of using televisions in a home for Internet conferencing.

BACKGROUND OF THE INVENTION

The Internet has become an indispensable part of our daily lives. Everyday, millions of people use the Internet to read news, shop on-line, search for information, and chat with others, etc. Recently, with the increased availability of high-speed connections to the Internet, the Internet is also becoming a major means of communications, supplementing and perhaps someday surpassing the capacities of conventional public telephone systems and satellite transmissions. Computer software and hardware are now well developed and readily available for users to hold video conferences over the Internet. For instance, a video camera with a Universal Serial Bus (USB) connection can be had for only tens of dollars, and some current operating systems, such as the Windows operating systems of Microsoft Corporation, provide a rich set of functions for supporting Internet video conferencing.

In the meantime, the number of home networks has being growing rapidly. The prices of personal computers and networking devices have fallen tremendously, and it is very easy for a user with multiple computers at home to set up a home network. As a result, computer networking is no longer limited to business/work places and has entered many homes. The availability of home networking has opened many possibilities of home automation. Such possibilities, however, are mostly unrealized at this time. Many users implement home networks mainly for the purpose of being able to access the Internet from different computers in the home and to share data and programs among the home computers, and the aspect of information/data access is largely independent of and unrelated to other aspects of home activities and functions. For instance, watching television is a major form of home entertainment. If a user watching television in the living room wants to conduct an Internet video conference, she has to go to her study room where her personal computer is located, sit down in front of the video camera mounted on her personal computer, and use the computer to do the video conferencing.

SUMMARY OF THE INVENTION

In view of the foregoing, the present invention provides a home network system that enables a user to use her television to conduct an Internet video conference from the comfort of her living room. The home network includes a personal computer that is connected to the Internet and has video conferencing software running thereon. The television is connected to the home network via a TV client module. A video camera located together with the television is also connected to the TV client. The TV client is connected to the personal computer via the home network and receives screen images from the personal computers and displays the images on the television. To initiate an Internet video conference, the user selects an Internet conferencing option displayed by the TV client on the television. In response, the TV client forwards the request to the personal computer. The personal computer then sends interactive user interface screens to the TV client for display on the television and receives user inputs through the TV client for the user to invoke the video conferencing application and control its settings. During the video conference, video/audio data captured by the video camera are transmitted by the TV client via the home network to the personal computer for forwarding on to the conferencing parties on the Internet, and conferencing user interface data representing video images and audio data received from conferencing parties on the Internet are transmitted by the personal computer to the TV client for display on the television.

DETAILED DESCRIPTION OF THE INVENTION

Figure 1:
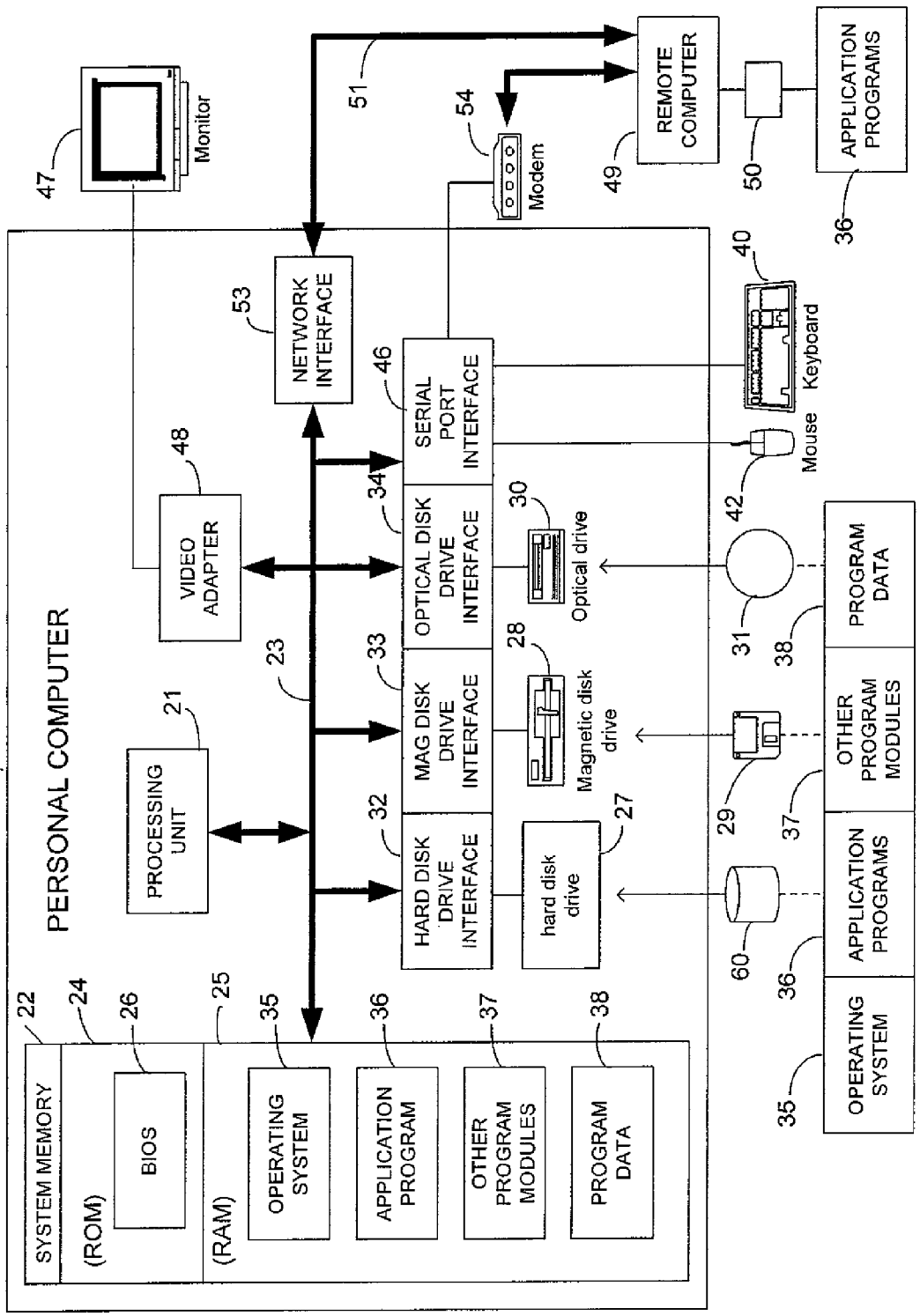
FIG. 1 is a block diagram generally illustrating an exemplary computer system on which components of an embodiment of a home network in accordance with the invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may implement components of a home network configured in accordance with the invention for integrating data access and home entertainment. The home network architecture of the invention that enables the use of a home television set for Internet video conferencing will be described in greater detail with reference to FIGS.

2-5. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24.

The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various ones of the acts and operations described hereinafter may also be implemented in hardware.

Figure 2:
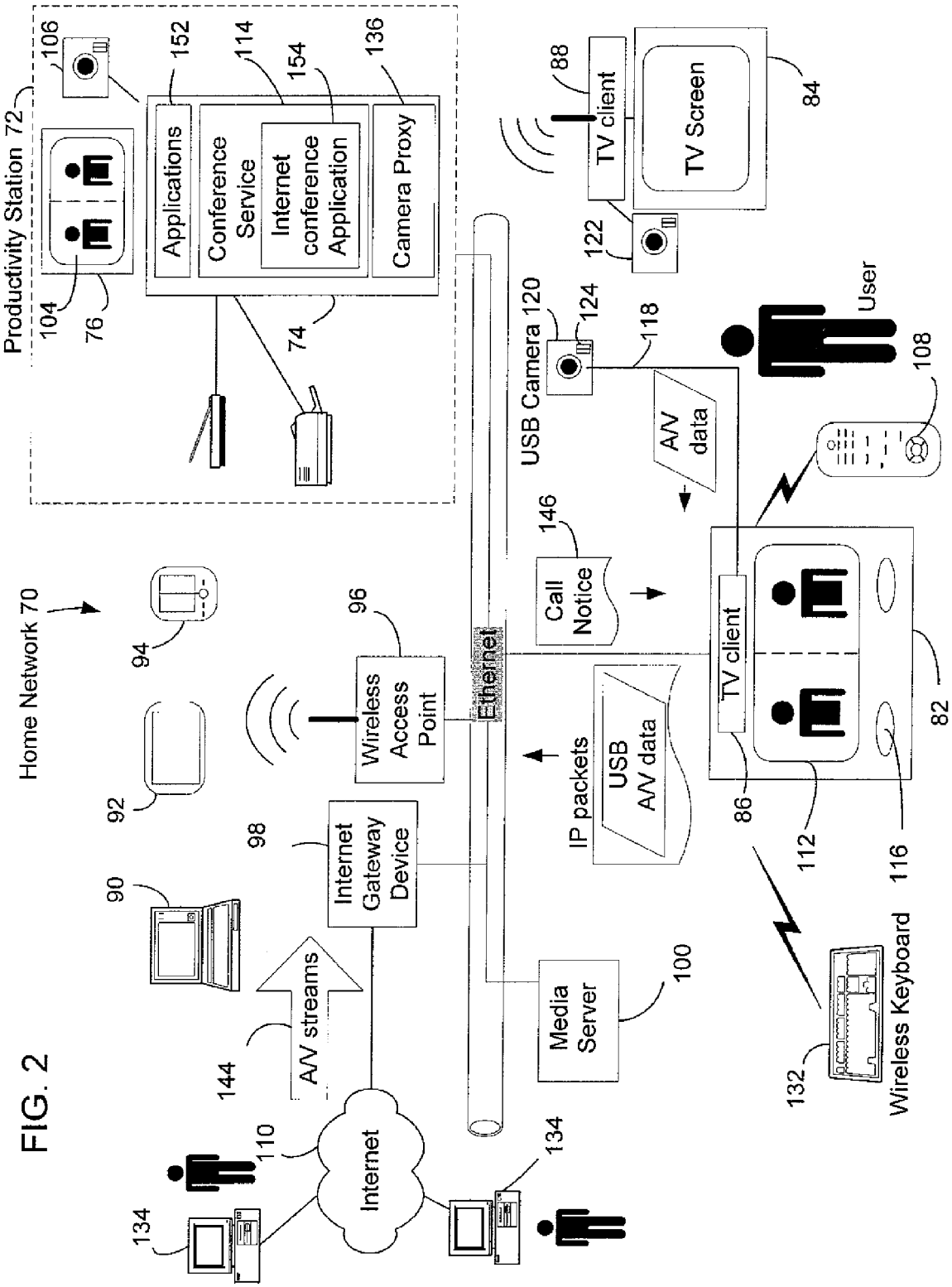
FIG. 2 is a schematic diagram showing an embodiment of a home network that is integrated with a television and a video camera to enable a user to have an Internet video conference using the television as a display.

Referring now to FIG. 2, the present invention is directed to an expanded home network system 70 that integrates a television into the home network so that a user can conduct an Internet video conference using the television as the display. In the embodiment shown in FIG. 2, the home network 70 connects devices for work and entertainment functions. For instance, a productivity station 72, which may be located in the study room in the house, includes a desktop personal computer 74 that may be connected to the home network via wired or wireless connections. The personal computer may include peripheral devices, such as a printer, a scanner, and a video camera, etc. The home network 70 is also connected to a television 82, which may be part of a home entertainment center located in the living room. As described in greater detail below, the television 82 has a TV client component 86 that is connected to the home network 70. Another television 84, which may be located in the bedroom, is also connected to the home network 70 by its media client component 88. The home network 70 may also have wireless devices connected thereto. To that end, the home network 70 includes one (or more) wireless access point (WAP) 96 that functions as the base station for a wireless local area network (LAN) and is typically plugged into an Ethernet hub or server of the home network. The wireless communications allows a user to move about in the house with her mobile device without losing connection to the home network. The wireless devices include, for example, a notebook computer 90, a tablet PC 92, a PDA 94, etc. In a preferred embodiment, the home network is an IP-based Ethernet network.

In accordance with an aspect of the invention, the personal computer 74 includes software and hardware for supporting Internet video conferencing, and is capable of accessing the Internet 110 for sending and receiving data packets, including data packets for video conferencing, through the Internet. In the illustrated embodiment, the personal computer 74 is connected to an Internet gateway device (IGD) 98, which may be connected to the Internet via different types of connections, such as a cable, a DSL line, an optical line, or a phone line (i.e., publicly switched telephone network (PSTN)). During an Internet video conferencing session, the monitor 76 of the personal computer may be used to display the video conference images 104 received from the Internet, and a video camera 106 is used to capture images of the user conducting the video conference. The data of the video images and sounds captured by the video camera 106 are sent to the personal computer 74 via a link connecting the personal computer and the camera. The link may be, for example, a Universal Serial Bus (USB) connection. [0015] In accordance with a feature of the invention, the home network 70 is configured to enable a user to conduct an Internet video conference on any television 82 or 84 in the house that is connected to the home network 74. Thus, the user is not confined to her seat in front of her computer 74, and can initiate and/or participate in an Internet video conference from the comfort of her living room. In accordance with the invention, each television is connected to the home network by a TV client. As illustrated in FIG. 2, the televisions 82, 84 have TV clients 86, 88, respectively, that connect the televisions to the home network 70. The TV client module for a television is preferably built into the television set, as in the case of the television 82. Alternatively, the TV client for a television may be an outboard device, similar to a set-top box, that drives the television with analog or digital video/audio signals, as in the case of the television 84. Each media client 86 or 88 is a microprocessor-based circuit with appropriate hardware and software.

To capture the images of a user for video conferencing, each television 82, 84 is equipped with a video camera 120, 122. The video camera 120, 122 is connected to the TV client 86, 88 of the television, and transmits the captured video images to the TV client. In one embodiment, the video camera 120 is a USB device, and is connected to the TV client 86 by a USB cable 118. The video camera 120 preferably has a built-in microphone 124 to capture the voice of the user, and transmits the audio data together with the video data to the TV client 86.

When the TV client 86 of a television 82 is loaded onto the home network 70, it automatically discovers the personal computer 74 connected to the home network, and forms a communication link over the home network with the personal computer. The discovery may be performed, for example, using the Universal Plug-and-Play (UPnP) process. When it discovers the existence of the personal computer 74 capable of Internet video conferencing, it puts in a local menu the "Internet video conference" option that can be selected by the user by, for example, pressing buttons on a remote control 108. Once the TV client 86 forms a link with the personal computer 74, it can receive user interface data including screenvideo image data and audio data from the personal computer. In a preferred embodiment, the television and the TV client are used by the personal computer as a remote monitor for displaying images and sound.

Figure 3:
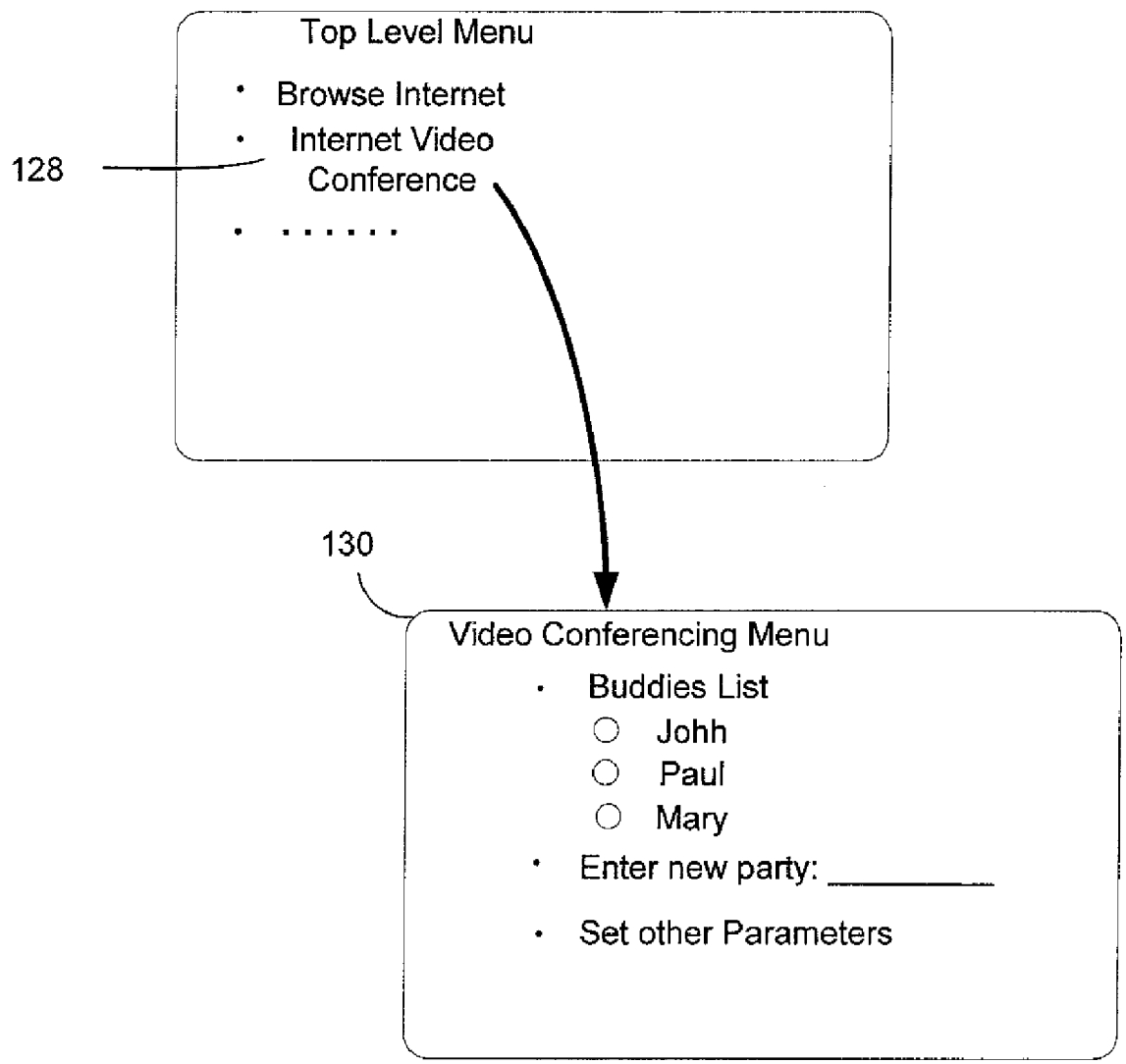
FIG. 3 is a schematic diagram illustrating exemplary user interface pages displayed on the television for a user to select the Internet video conference function and to set parameters for the video conference.

This "remoting" capability may be provided by the operating system of the personal computer by implementing, for example, the Windows Remote Desktop Protocol (RDP). During an Internet video conference, the video conferencing application 154 receives incoming streaming video and audio data from the conferencing parties on the Internet and generates conferencing user interface data that represent the received streaming video and audio. The conferencing user interface data include screen images of the conferencing parties and the sound of the conferencing dialog. If the user is sitting in front of her computer, the conferencing user interface data may be displayed on the monitor 76 of the personal computer 74. With the television 82 being used for video conferencing, the television and the TV client are used as a remote terminal. The conference service 114 of the personal computer 74 packages the conferencing user interface data generated by the video conferencing application 154 using the RDP protocol and transmits the RDP packaged data over the home network to the TV client 86. The television then displays the received screen images on the screen 112 of the television 82 and plays the sound through the TV speakers 116 or other speakers connected to it. [0018] To enable the user to invoke the Internet video conferencing functionality, the TV client 86 is programmed to provide a user interface to allow the user to select the function of video conferencing. On any television in the house that has a TV client device connected to the home network 70, a user can use a remote control 108 to send command signals to the TV client to interactively select networking options presented by the TV client on the television. Turning now to FIG. 3, in one exemplary implementation, the local menu of the TV client 86 has a starting page 126 that presents a menu option 128 of "Internet Video Conference." When the user selects the "Internet Video Conference" option, the TV client 86 transmits a request to the personal computer 74 to initiate an Internet video conference. In response, the conference server 114 of the personal computer runs the Internet conference application set up an Internet video conference. To that end, an interactive user interface is "remoted" (i.e., delivered to a remote device for presentation thereon) to the TV client 86 for display on the television 82, and the user inputs (e.g., entered using a remote control 108 or a wireless keyboard 132) are transmitted by the TV client to the personal computer. In this way, the television and the TV client together function as a remote terminal for the personal computer, and the user will be presented with the same user interface for invoking the Internet video conferencing application 154 and controlling its settings as if the user is sitting in front of the computer 74. As illustrated in FIG. 3, the remoted user interface 130 allows the user to set the parameters for the video conference. For instance, the user interface may allow the user to select a conferencing party from a list of pre-set "buddies" to have a conference with, or to specify (by using a wireless keyboard 132) a new conferencing party not on the existing list. After the user enters the parameters for the video conference, the Internet video conferencing application 154 is launched to call up the specified conferencing parties 134 over the Internet 110, and establish the video/audio transmissions for the video conference. Once the video conference starts, the video conferencing application 154 on the personal computer 74 receives video/audio streams 144 over the Internet from the remote conferencing parties 134, and generates from the received streaming data conferencing user interface data that include screen images and audio for display on the monitor 76 or a remote terminal. The conference service 114 then packages the conferencing user interface data using the RDP protocol and transmits the packaged RDP packets 156 (FIG. 4) to the TV client over the home network. The TV client interprets and renders the received RDP packets and displays the images and plays the sound on the television. Thus, the conference service 114 of the personal computer 74 handles aspects of the wide-area network (WAN) communication over the Internet and higher level video conferencing obligations and services to offload those tasks from the TV client, which may be a thin client and does not have all the computational power and resources needed to handle the video conferencing by itself. This capability of receiving and processing the RDP packets 156 is generic and is applicable to all computer applications via the general remote desktop capability in the operating system of the personal computer 74. In the meantime, the TV client 86 relays the video and audio data captured by the video camera 120 over the home network 70 to the video conferencing application 154 of the personal computer 74, which forwards the data to the Internet 110 as an audio/video stream 140 for transmission to the conferencing parties.

The feature of Internet video conferencing can also be initiated from the television side in response to an incoming conference call. The user can check the user interface screens for video conferencing presented remotely on the television to see whether a conference call has arrived if she is expecting that call. Also, when the conference server 114 of the personal computer 74 receives a conference call from the Internet 110, it sends an alert 146 to the TV client 86 notifying it of the incoming conference call. In response, the TV client 86 may display a user interface on the television 82 to inform the user of the incoming conference call, and provide options such as whether to take the conference call and/or whether to use the television to conduct the video conference.

Figure 4:
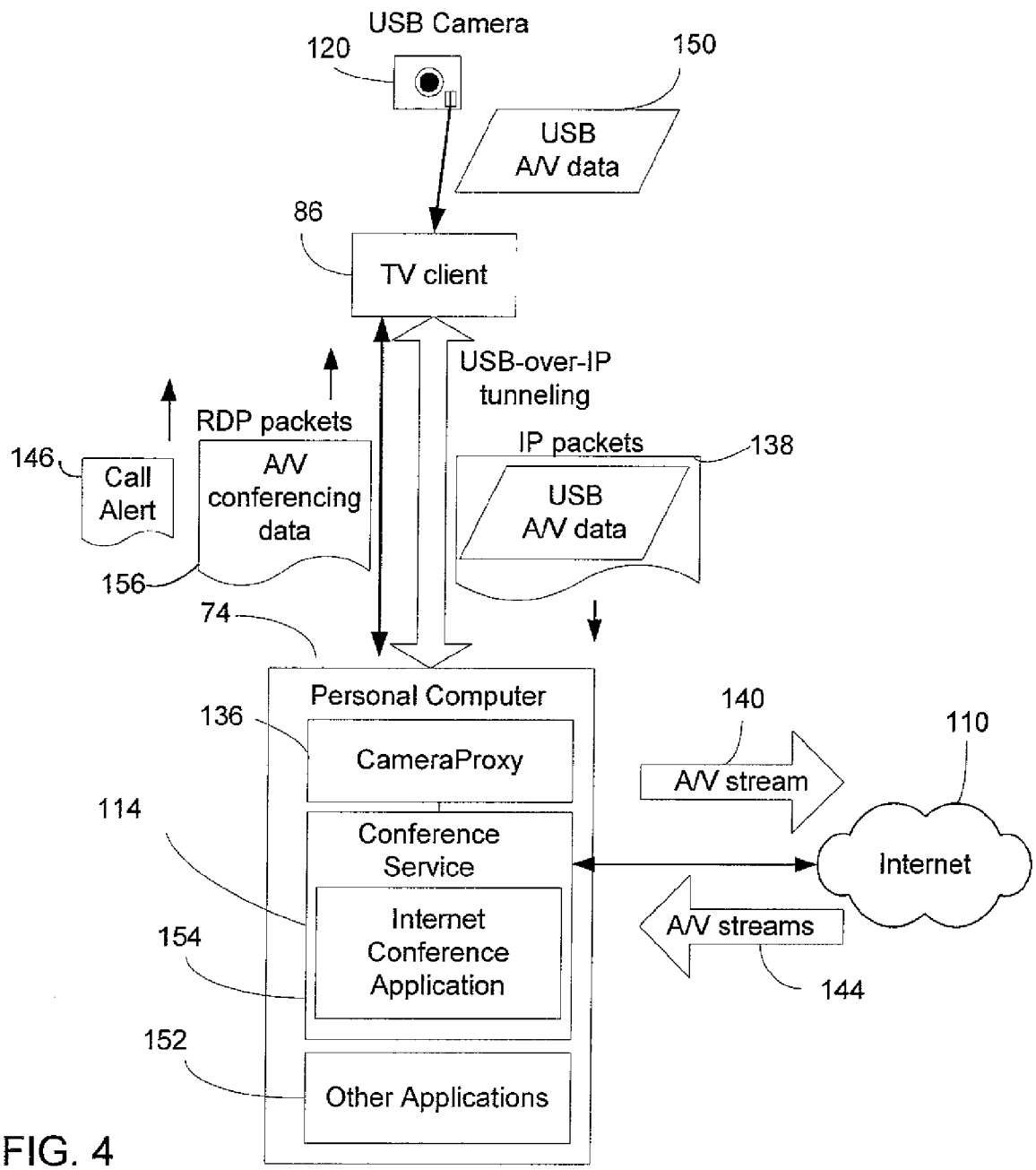
FIG. 4 is a schematic diagram showing the transmission of video image and audio data captured by a USB camera from a TV client component of the television to a computing device over the home network using USB-to-IP tunneling.

As mentioned above, in a preferred embodiment, the video camera 120 communicates with the TV client 86 via a USB cable 118. In accordance with a feature of the embodiment, USB-over-IP tunneling is used by the TV client 86 to transfer the video/audio data to the personal computer 74. Although in the context of video conferencing on the television the USB-over-IP tunneling is used for transferring data generated by the USB camera, it should be noted that this mechanism is generic to all USB devices and not specific to cameras. Specifically, as illustrated in FIG. 4, the TV client 86 wraps the audio/video data 150 it received from the USB camera 120 in IP packets 138 and sends the IP packets to the personal computer 74. A USB proxy 136 on the personal computer 74 then unwraps the USB data, i.e., taking the USB data from the IP packets. The USB proxy 136 and the TV client 86 also handle the wrapping and unwrapping in the reverser direction. By means of the USB-over-IP tunneling, the USB proxy 136 bridges (two ways) between the personal computer 74 and the remote USB camera 120 over the IP connection through the home network with the TV client 86. Due to this bridging, the USB camera 120 exhibits all the behavior of a camera locally connected to the personal computer 74. As a result, every application 152 on the personal computer, such as a conferencing program, that uses a USB camera 120 can function properly without any modification, thinking that the camera is locally connected, even though the camera is remote on the home IP network.

In the embodiment described above, a personal computer 74 provides the Internet video conference capabilities that are leveraged by the TV client 86 to enable video conferencing on a television 82. A full-fledged computer, however, is not required for implementing the invention. In an alternative embodiment, a media server 100 (also shown in FIG. 2) is used to provide the Internet video conference functionality. The media server 100 is a computing device that may have its hardware housed in an enclosure similar to a set-top box. It is connected to the home network 70 and runs all the software needed to support Internet video conferencing, but does not have to have its own monitor screen, keyboard, video camera, etc. attached thereto. When the TV client 86 is attached to the home network, it discovers the media server 100, and interacts with the media server to use the Internet video conferencing functionality provided by the media server to carry out video conferencing from the television 82.

Figure 5:
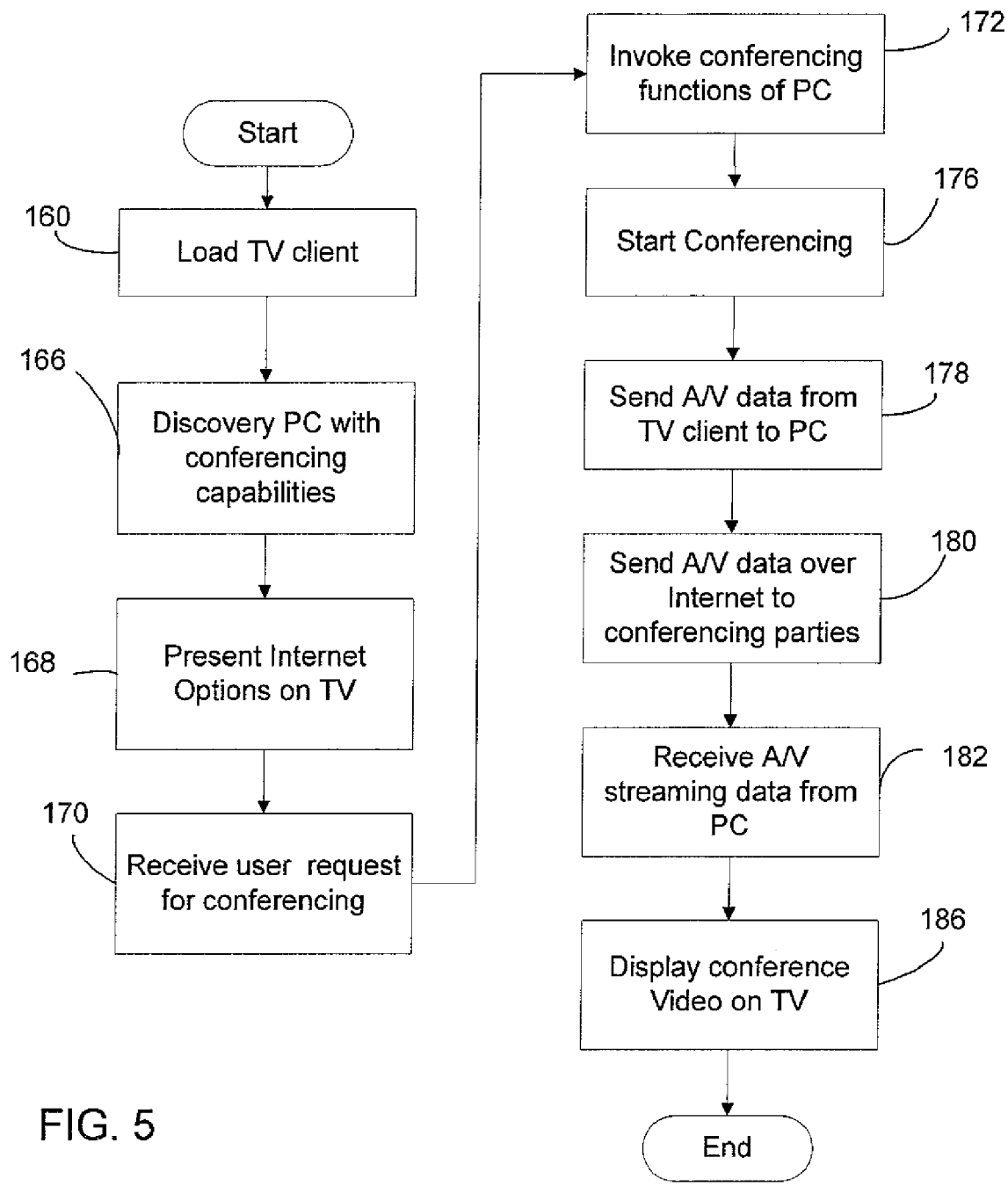
FIG. 5 is a flow diagram summarizing the operation of Internet video conferencing from a television connected to a home network in an embodiment of the invention.

The operations of the TV client 86 and the personal computer 74 in the embodiment of FIG. 2 for allowing the user to do Internet video conferencing from her television is summarized in FIG. 5. Upon loading of the TV client (step 160), the TV client 86 discovers any computing device on the home network that can provide the Internet video conferencing functionality. In this example, the personal computer 74 is discovered (step 166). The TV client 86 then includes an option of "Internet Video Conference" in a local menu as part of its user interface (step 168). When the user invokes the Internet video conferencing functionality by selecting that option in the local menu presented on the television 82 by the TV client 86 (step 170), the TV client sends the request to the personal computer 74 (step 172). In response, the personal computer 74 runs the Internet conferencing software and sets up the video conference (step 176). During the video conference, the TV client 86 sends the video/audio data captured by the USB camera 120 to personal computer using the USB-to-IP tunneling as described above (step 178). The USB proxy 136 on the personal computer retrieves the USB data from the IP packets received from the TV client, and the Internet video conferencing program forwards the video/audio information to the conferencing parties over the Internet (step 180). In the reverse direction, the personal computer 74 receives streams of video/audio data from the conferencing parties on the Internet, performs appropriate processing on the received video/audio data, and forwards the processed video/audio data in RDP packets 156 over the IP home network 70 to the TV client 86 (step 182). The TV client 86 then plays the video/audio on the television 82 (step 186). [0023] In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. In a home networking environment with a television client, a method for a computing device with connectivity to the Internet to provide video conferencing, the method comprising:
  receiving, by the computing device, incoming video conferencing data from a video conferencing party on the Internet;
  transmitting, by the computing device, conferencing user interface data representing the incoming video conferencing data over the home network to the television client for display on a television, wherein the computing device utilizes a first transmission protocol and data tunneling to perform the transmitting;
  receiving, by the computing device, outgoing video conferencing data from the television client, wherein the computing device utilizes a second transmission protocol and the data tunneling to perform the receiving, the second transmission protocol being different from the first transmission protocol; and
  forwarding, by the computing device, the outgoing video conferencing data to the video conferencing party on the Internet.

2. The method of claim 1 further comprising:
  receiving user inputs for parameters for an Internet video conference from the television client.

3. The method of claim 1 wherein transmitting comprises converting the incoming video conferencing data into user interface data for display on the television by the television client.

4. The method of claim 1 wherein the outgoing video conferencing data is received as USB data contained in IP packets; and
  wherein receiving outgoing video conferencing data comprises extracting USB data from IP packets received from the television client.

5. The method of claim 1 further comprising:
  receiving an incoming call for Internet video conferencing; and
  transmitting an alert regarding the incoming call to the television client.

6. The method of claim 1, further comprising:
  receiving from the television client a request to conduct an Internet video conference, the television client being connected to the television and controlling display of images on the television; and
  setting up the Internet video conference according to the request with the conferencing party on the Internet.

7. A computing device comprising:
  a processor;
  a conference service configured to be operated by the processor to perform operations including:
    receiving outgoing video conferencing data from a television client that is connected to the computing device through a home network environment, wherein the outgoing video conferencing data is universal serial bus (USB) data that has been wrapped by the television client into Internet Protocol (IP) packets; and
    forwarding, by the computing device, processed outgoing video conferencing data to a video conferencing party on the Internet; and
  a camera proxy configured to be operated by the processor to unwrap the USB data from the IP packets and to provide the unwrapped USB data to the conference service for inclusion in the processed outgoing video conferencing data.

8. The computing device of claim 7, wherein the television client is implemented in a television that is directly, connected to a video camera, the video camera providing the USB data to the television client.

9. The computing device of claim 7, wherein the operations further include:
  receiving incoming video conferencing data from the video conferencing party on the Internet; and
  transmitting, by the computing device, conferencing user interface data representing the incoming video conferencing data over the home network to the television client for display on a television.

10. The computing device of claim 9, wherein the computing device utilizes a remote desktop protocol (RDP) to perform the transmitting.

11. The computing device of claim 9, wherein transmitting comprises converting the incoming video conferencing data into the user interface data.

12. The computing device of claim 7, wherein the operations further include receiving user inputs for parameters for an Internet video conference from the television client.

13. The computing device of claim 7, wherein the operations further include:
  receiving an incoming call for Internet video conferencing; and
  transmitting an alert regarding the incoming call to the television client.

14. The computing device of claim 7, wherein the operations further include:
  receiving from the television client a request to conduct an Internet video conference; and
  setting up the Internet video conference according to the request with the video conferencing party on the Internet.

15. The computing device of claim 7, wherein the home network environment employs data tunneling between the television client and the computing device.

16. A computer-readable storage medium not consisting of a propagated data signal comprising executable instructions stored thereon for programming a computing device to perform operations including:
  receiving from a television client on a home network a request to conduct an Internet video conference, the television client being connected to a television and controlling display of images on the television;
  setting up an Internet video conference according to the request with a conferencing party on the Internet;
  receiving incoming video conferencing data from a video conferencing party on the Internet;
  transmitting conferencing user interface data representing the incoming video conferencing data over the home network to the television client for display on a television, wherein the computing device utilizes a remote desktop protocol (RDP) and data tunneling to perform the transmitting;
  receiving outgoing video conferencing data from the television client, wherein the computing device utilizes an Internet Protocol (IP) and the data tunneling to perform the receiving; and
  forwarding the outgoing video conferencing data to the video conferencing party on the Internet.

* * * * *